(12) United States Patent
Iwama

(10) Patent No.: US 8,540,215 B2
(45) Date of Patent: Sep. 24, 2013

(54) WIRE GRIP

(75) Inventor: Tamotsu Iwama, Osaka (JP)

(73) Assignee: Nagaki Seiki Co., Ltd., Osaka (JP)

( * ) Notice: Subject to any disclaimer, the term of this patent is extended or adjusted under 35 U.S.C. 154(b) by 0 days.

(21) Appl. No.: 13/259,033

(22) PCT Filed: Jun. 30, 2009

(86) PCT No.: PCT/JP2009/061905
§ 371 (c)(1),
(2), (4) Date: Nov. 30, 2011

(87) PCT Pub. No.: WO2011/001502
PCT Pub. Date: Jan. 6, 2011

(65) Prior Publication Data
US 2012/0132874 A1 May 31, 2012

(51) Int. Cl.
| | | |
|---|---|---|
| B66F 1/00 | (2006.01) | |
| A62B 35/04 | (2006.01) | |
| D06F 53/00 | (2006.01) | |
| F16G 11/10 | (2006.01) | |
| B63B 35/03 | (2006.01) | |
| B65H 59/00 | (2006.01) | |
| E21C 29/16 | (2006.01) | |
| H02G 1/08 | (2006.01) | |

(52) U.S. Cl.
USPC ............... 254/134.3 R; 254/105; 24/134 R

(58) Field of Classification Search
USPC .......... 254/134.3 R, 105; 24/134 KB, 134 R, 24/132 R, 134 N
See application file for complete search history.

(56) References Cited

U.S. PATENT DOCUMENTS

| | | | | |
|---|---|---|---|---|
| 531,700 | A | * | 1/1895 | Rowland ............ 24/134 N |
| 1,464,939 | A | * | 8/1923 | Kearney ............ 24/134 N |
| 1,942,625 | A | * | 1/1934 | Whalan et al. ...... 24/132 R |
| 2,140,837 | A | * | 12/1938 | Ross ................. 24/134 N |
| 2,245,811 | A | * | 6/1941 | O'Russa ............ 24/134 N |

(Continued)

FOREIGN PATENT DOCUMENTS

| | | |
|---|---|---|
| JP | 59-195926 | 12/1984 |
| JP | 2004-242477 | 8/2004 |
| JP | 2004-304969 | 10/2004 |

*Primary Examiner* — Lee D Wilson
*Assistant Examiner* — Alvin Grant
(74) *Attorney, Agent, or Firm* — Wilson, Sonsini, Goodrich & Rosati

(57) ABSTRACT

A wire grip comprising a stationary-side gripping portion provided with a body and having a substantially straight front shape, and a movable-side wire gripping portion arranged to face the stationary-side wire gripping portion and set movable back and forth with respect to the stationary-side wire gripping portion, whereby the linear object can be gripped between the stationary-side wire gripping portion and the movable-side wire gripping portion, wherein a first action portion for moving the movable-side wire gripping portion back and forth and a second action portion connected to the first action portion by a connecting rod are turnably attached at their individual ends to the body, wherein the other end of the first action portion and the other end of the second action portion are turnably attached to one end of the connection rod and an intermediate portion of the connection rod, respectively, wherein the other end of the connecting rod is pulled substantially parallel to the stationary-side wire gripping portion and the movable-side wire gripping portion so that the connecting rod, the second action portion and the first action portion are linked to act to move the movable-side wire gripping portion forward with respect to the stationary-side wire gripping portion.

6 Claims, 5 Drawing Sheets

(56) References Cited

U.S. PATENT DOCUMENTS

| | | | |
|---|---|---|---|
| 2,330,736 A * | 9/1943 | Paulson | 24/132 R |
| D136,818 S * | 12/1943 | Paulson | D8/44 |
| 2,900,690 A * | 8/1959 | Suenram | 24/134 R |
| 2,985,933 A * | 5/1961 | Peterson et al. | 24/132 R |
| 3,262,171 A * | 7/1966 | Scholz | 24/134 R |
| 3,410,525 A * | 11/1968 | Tanson | 254/105 |
| 3,824,653 A * | 7/1974 | Sholler | 24/134 KB |
| 3,923,333 A * | 12/1975 | Whaley | 294/104 |
| 5,638,919 A * | 6/1997 | Pejout | 182/192 |
| 5,855,251 A * | 1/1999 | Deuer | 182/5 |
| 6,212,919 B1 * | 4/2001 | Gerow | 70/18 |
| 7,080,716 B2 * | 7/2006 | Cherpitel | 182/192 |
| D633,783 S * | 3/2011 | Iwama | D8/395 |
| D633,784 S * | 3/2011 | Iwama | D8/395 |

\* cited by examiner

WIRE GRIP

TECHNICAL FIELD

The present invention relates to a wire grip used for gripping a linear object such as an electric wire, i.e. an electric power wire and a communication wire and an elevator wire to brace the linear object.

BACKGROUND OF THE INVENTION

Conventionally, for bracing the wire in an electric wire construction, a wire grip that grips the electric wire is used to pull the electric wire by a wire puller.

However, most of the conventional wire grips have problems of working inefficiency. For example a worker must move during a step of inserting a linear object (an electric wire) and a step of fixing the linear object by a grip member of the wire grip. Therefore, the wire grips have been required to improve their efficiency when they are used to brace wires in a dangerous situation such as work in high places and in a small area where work space is limited.

Therefore, the wire grip 500 described as follows has been suggested and introduced (see The Patent Document 1). The wire grip 500 has a structure in which a action portion 503 activates a movable-side wire gripping portion 52 to grip the linear object W when a stationary-side wire gripping portion 501 as described in FIG. 5 is hung on the linear object and then a an arc-like pulling portion 504 inserted into an inserting opening 505 is pulled in the direction of an arrow A. And the wire grip 500 can also be operated easily by workers without moving from a front side of the wire grip 500.

However, in the wire grip 500 shown in FIG. 5, since the pulling portion 504 is pulled in the direction of the arrow A (obliquely downward to the right as shown in FIG. 5) when the linear object W is gripped, a clockwise moment as shown in FIG. 5 is added to the wire grip 500. Thus, excessive load is applied to the linear object W in a B portion and then the linear object W may curve. If the linear object W curves again and again, it leads to problems such that the life of the wire grip decreases and the wire grip can be damaged.

THE PRIOR ART DOCUMENT

The Patent Document 1: Japanese Patent Publication No. 2004-242477.

SUMMARY OF THE INVENTION

In view of problems described above, the problems to be solved by the invention are to provide the wire grip which has excellent workability for bracing the wire and can grip the linear object for bracing the wire without applying any excessive load to the linear object.

This invention associated with claim 1 relates to a wire grip which comprises a stationary-side wire gripping portion provided with a body and having a substantially straight front shape, and a movable-side wire gripping portion arranged to face the stationary-side wire gripping portion and set movable back and forth with respect to the stationary-side wire gripping portion, whereby the linear object can be gripped between the stationary-side wire gripping portion and the movable-side wire gripping portion, wherein a first action portion for moving the movable-side wire gripping portion back and forth and a second action portion connected to the first action portion by a connecting rod are turnably attached at their individual ends to the body, wherein the other end of the first action portion and the other end of the second action portion are turnably attached to one end of the connection rod and an intermediate portion of the connection rod, respectively, wherein the other end of the connecting rod is pulled substantially parallel to the stationary-side wire gripping portion and the movable-side wire gripping portion so that the connecting rod, the second action portion and the first action portion are linked to act to move the movable-side wire gripping portion forward with respect to the stationary-side wire gripping portion.

This invention associated with claim 2 relates to the wire grip described in claim 1, wherein the other end of the connecting rod is located in the vicinity of an extension line of the movable-side wire gripping portion.

According to the invention associated with claim 1, the wire grip comprises a stationary-side wire gripping portion provided with the body and having a substantially straight front shape, and a movable-side wire gripping portion arranged to face the stationary-side wire gripping portion and set movable back and forth with respect to the stationary-side wire gripping portion, whereby the linear object can be gripped between the stationary-side wire gripping portion and the movable-side wire gripping portion, wherein the first action portion for moving the movable-side wire gripping portion back and forth and the second action portion connected to the first action portion by the connecting rod are turnably attached at their individual ends to the body, wherein the other end of the first action portion and the other end of the second action portion are turnably attached to one end of the connection rod and an intermediate portion of the connection rod, respectively, wherein the other end of the connecting rod is pulled substantially parallel to the stationary-side wire gripping portion and the movable-side wire gripping portion so that the connecting rod, the second action portion and the first action portion are linked to act to move the movable-side wire gripping portion forward with respect to the stationary-side wire gripping portion, thereby allowing the movable-side wire gripping portion to move back and forth without bringing a moment to the wire grip. Thus, excessive load is less applied to the linear object which is gripped between the stationary-side wire gripping portion and the movable-side wire gripping portion. Therefore, it is less likely that the linear object may curve again and again and be damaged. In addition, since the wire grip can activate the movable-side wire gripping portion to grip the linear object by only hanging the stationary-side wire gripping portion on the linear object and pulling the pulling portion, A worker can easily operate the wire grip from the front side of the wire grip without moving, thus the wire grip is also excellent in workability.

According to the invention associated with claim 2, the other end of the connecting rod can pull the connecting rod in a close position to the linear object because it is located in the vicinity of the extension line of the movable-side wire gripping portion. Therefore, the moment is less brought to the wire grip and no excessive load is applied to the linear object.

DETAILED DESCRIPTION OF THE INVENTION

Figure 1:
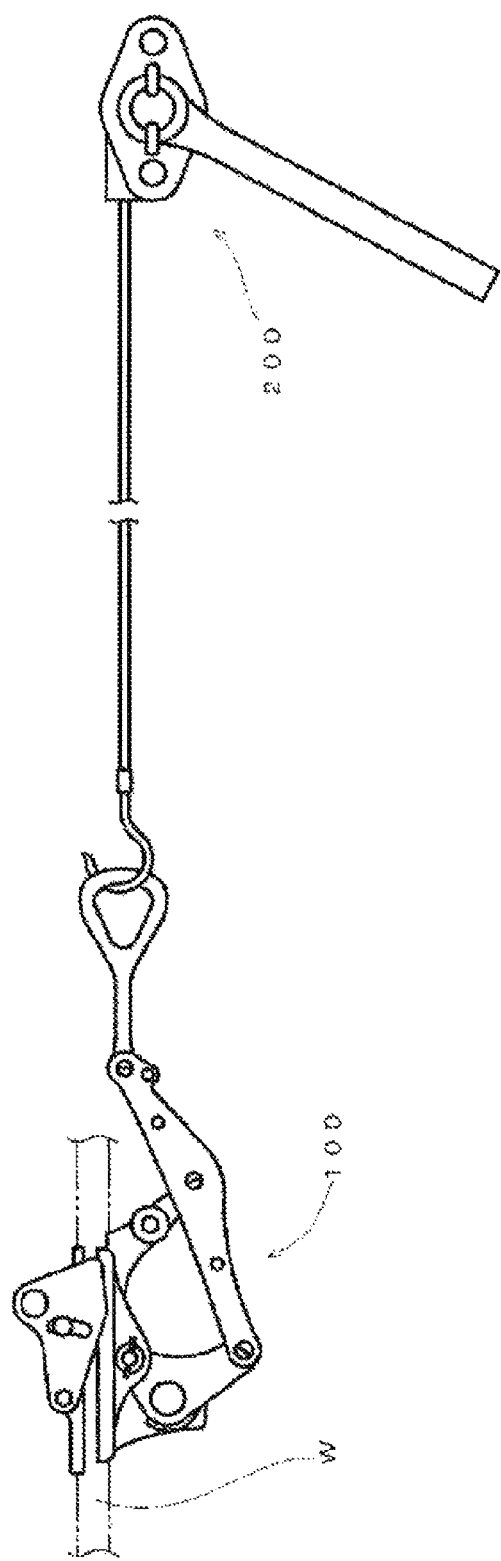
FIG. 1 illustrates an example for using the wire grip associated with the invention.

Referring to the drawings, preferred embodiments of the wire grip associated with the invention are described below.

Figure 2:
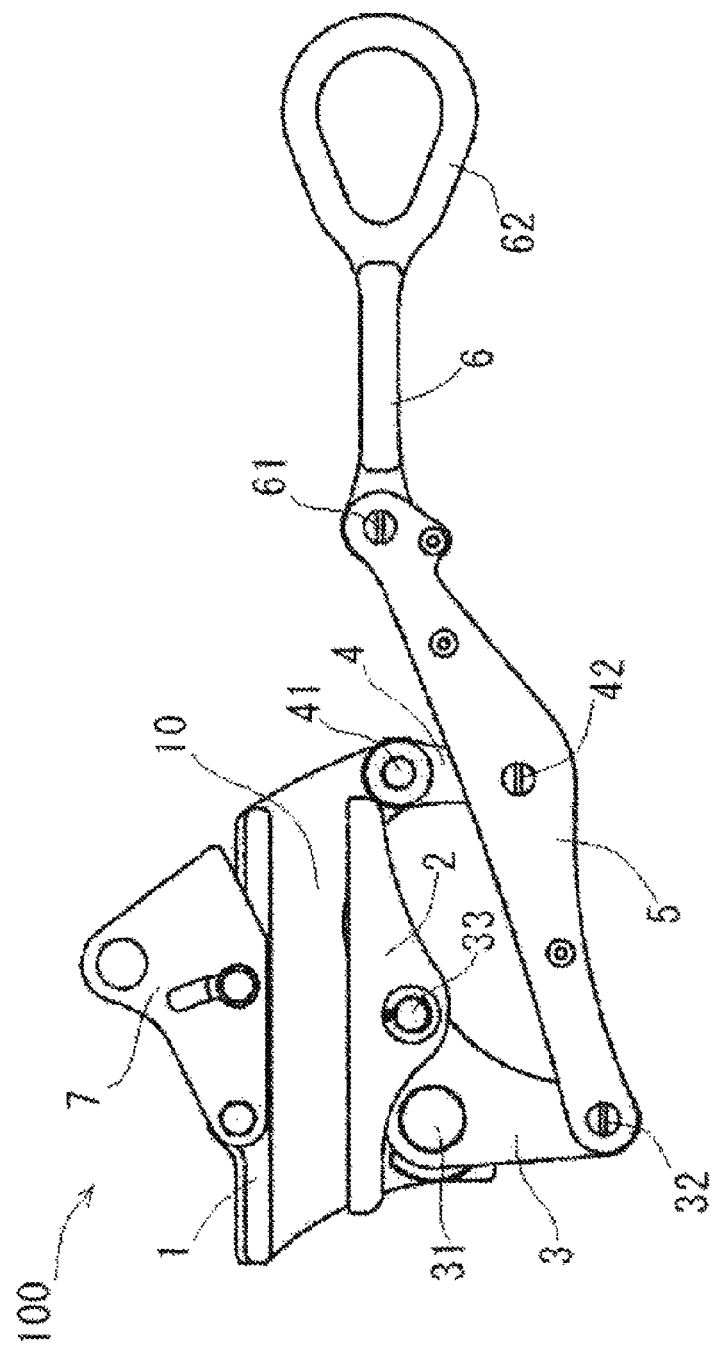
FIG. 2 illustrates a front view of the wire grip associated with the invention.
Figure 4:
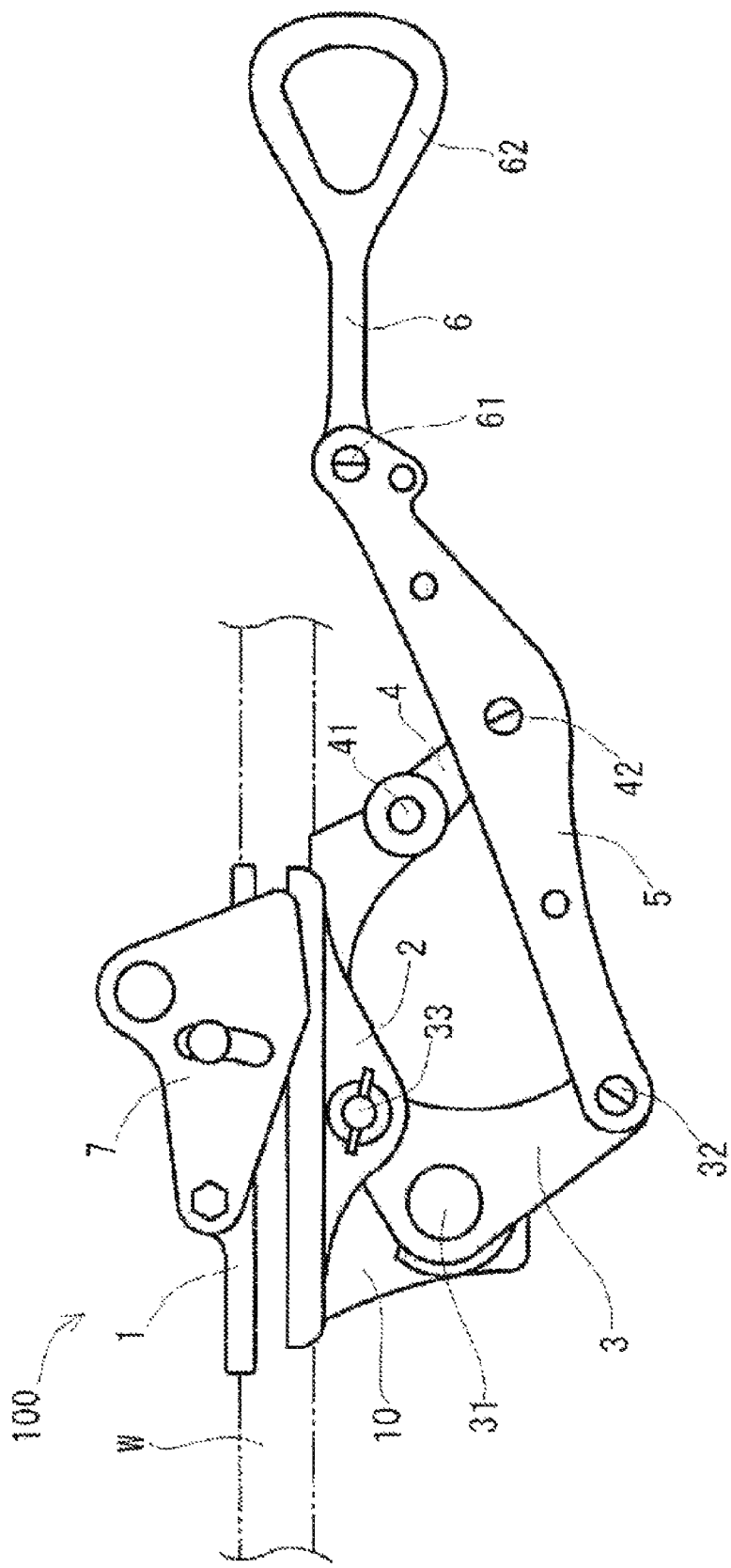
FIG. 4 illustrates a front view of the wire grip associated with the invention which is in a state of gripping the linear object.
Figure 5:
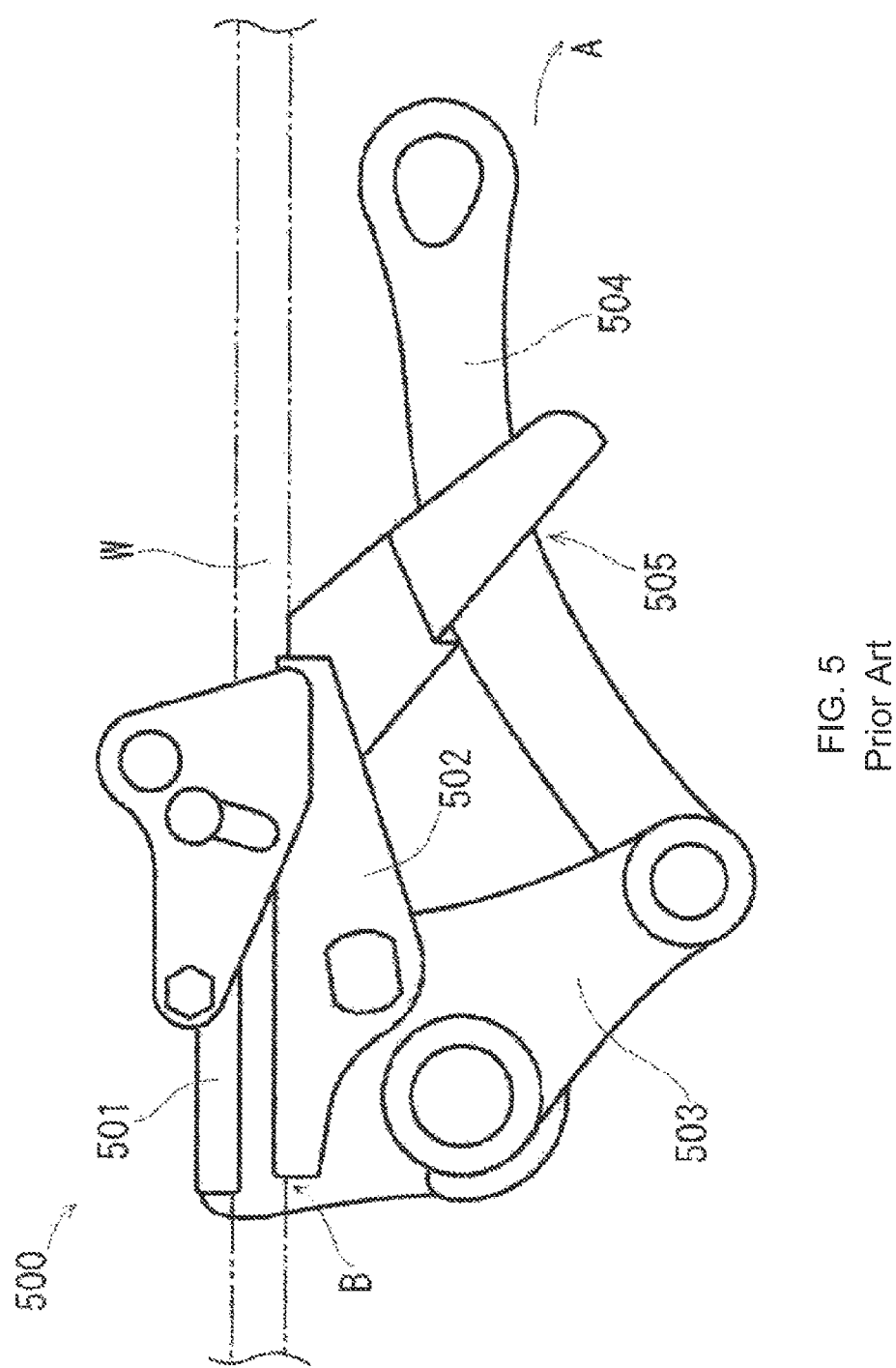
FIG. 5 illustrates a front view of a conventional wire grip.

FIG. 1 illustrates a general example for using a wire grip 100 associated with the invention. Additionally, the front side of the sheets in FIGS. 1, 2, and 4 is considered to be the front side of the wire grip and the directions of top, bottom, left, and right of the sheets in FIGS. 1, 2, and 4 are considered to be the upside, downside, left-side, and right-side of the wire grip herein, respectively. However those directions of the wire grip associated with the invention may be different from those shown in the drawings when the wire grip is used.

As shown in FIG. 1, the wire grip 100 associated with the invention is connected with the wire puller 200 and used for bracing the wire. In particular, it is used for gripping the linear object W in applying tension by pulling the linear object W such as an elevator wire and an electric wire, i.e. an electric power wire and a communication wire with the wire puller 200.

Although not shown in the drawings, the wire grip is also used for cutting and dividing the linear object W when the linear object becomes slack by an installation of the wire grip 100 both on one side and the other side of the wire puller 200, gripping one linear object W with two wire grips 100, and pulling the linear object W with the wire grips.

Figure 3:
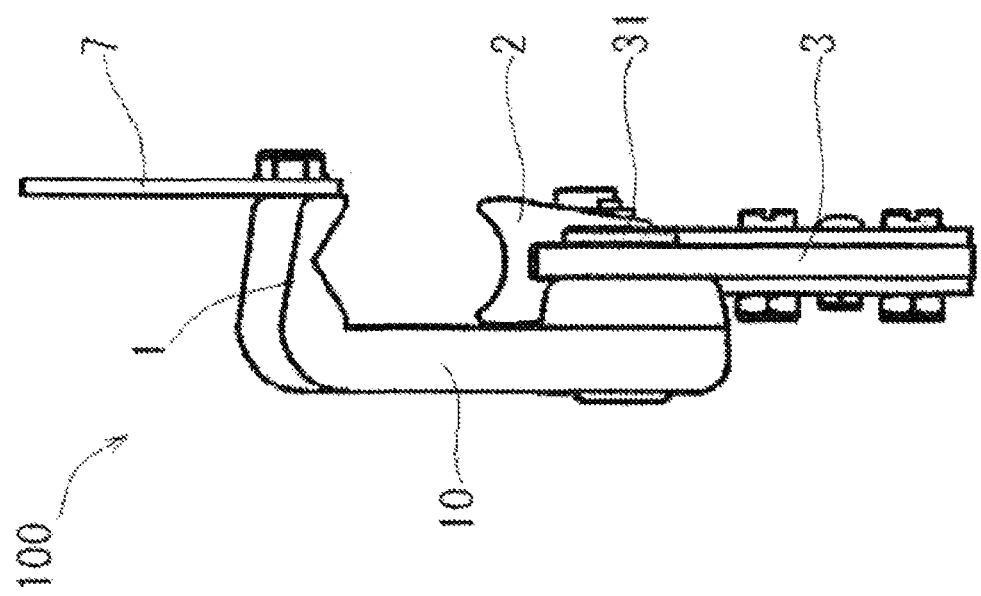
FIG. 3 illustrates a left-side view of the wire grip associated with the invention.

FIG. 2 illustrates the front view of the wire grip 100, and FIG. 3 illustrates the left-side view of the wire grip 100.

As shown in FIG. 2, the wire grip 100 comprises a stationary-side wire gripping portion 1 provided with the top end of the body 10 and having the substantially straight front shape, and a movable-side wire gripping portion 2 which has the substantially straight front shape as well and is arranged to face the downside of the stationary-side wire gripping portion 1.

Additionally, as shown in FIG. 3, the stationary-side wire gripping portion 1 is not only formed into a substantially L-shape integrally with the body 10 in a side view in this embodiment, but also can be provided as other members.

In addition, each cross section in a lateral view of the stationary-side wire gripping portion 1 and the movable-side wire gripping portion 2 is preferably in a V-shape or an arc-like shape in which each recess faces each other. More preferably, as shown in FIG. 3, it is preferable that the stationary-side wire gripping portion 1 is in the V-shape and the movable-side wire gripping portion 2 is in the arc-like shape.

Thus, the linear object can be positioned without any position gaps since the stationary-side wire gripping portion 1 in the V-shaped cross section is in contact with the linear object in a substantially circular in cross section view at 2 spots on the cross section of the stationary-side wire gripping portion 1, and the movable-side wire gripping portion 2 in the arc-like shaped cross section can firmly grip the linear object since the surface of the movable-side wire gripping portion 2 is in contact with the peripheral surface of the linear object. Therefore, the linear object can be firmly positioned and fixed by gripping the linear object positioned in the stationary-side wire gripping portion 1 with the movable-side wire gripping portion 2.

As shown in FIG. 2, one end of the first action portion 3 on the bottom and left end in the front view of the body 10 and one end of the second action portion 4 on the bottom and right end in the front view of the body 10 are turnably attached to the body 10 as a pivot 31 and a pivot 41, respectively. These first action portion 3 and second action portion 4 extend from the body to the downside and substantially parallel to each other.

Additionally, the other end of the first action portion 3 and the other end of the second action portion 4 are turnably connected to the connecting rod 5 as a pivot 32 and a pivot 42, respectively.

Furthermore, the first action portion 3 is substantially perpendicular to a line connecting the pivot 31 and the pivot 32 and the first action portion 3 extends from the vicinity of the pivot 31 to the right-side to take on a substantially L-shape as a whole. And the extended end is turnably connected to the movable-side wire gripping portion 2 as a working point 33 which moves together with the movable-side wire gripping portion 2 by a rotation of the first action portion 3 around the pivot 31.

The pivot 32 and the pivot 42 are located on a left end in the front view and an intermediated portion of the connecting rod 5, respectively. And on a right end in the front view of the connecting rod 5, the pulling portion 6 is turnably attached to the connecting rod 5, setting the left end in the front view as a pivot 61. In addition, the pivot 32, 42, and 61 are disposed in the substantially same straight line. A shape of the connecting rod 5 is not specifically limited, but the connecting rod is formed into a substantially straight shape in the illustrated examples.

It is preferable that a loop portion 62 is formed on the right end in the front view of the pulling portion 6 as shown in FIG. 2. This is because that the wire grip can be easily connected to the wire puller 200 by a hook of the wire puller 200 or the like in connecting the wire puller 200 as shown in FIG. 1.

FIG. 4 illustrates the front view of the wire grip which is in the state of gripping the linear object and describes actions of the wire grip 100. To begin with, in FIG. 2, the linear object W (omitted in FIG. 2) is located between the stationary-side wire gripping portion 1 and the movable-side wire gripping portion 2, and is fit into the stationary-side wire gripping portion 1. In this state, the connecting rod is pulled to the right-side in the front view substantially parallel to the stationary-side wire gripping portion 1, more specifically, to the linear object W (omitted in FIG. 2) with the pulling portion 62. Also, the connecting rod 5 may be directly pulled by a wire of the wire puller 200 (omitted in FIG. 4) or the like attached to the pivot 61 without the pulling portion 62.

By pulling the connecting rod 5 to the right-side with the pulling portion 62, the connecting rod 5 moves to the right-side, rotating in a clockwise fashion around the pivot 61 as shown in FIG. 4. Thereby, the first action portion 3 and the second action portion 4 are pulled to the right-side at the pivot 32 and 42, rotating in a counterclockwise fashion around the pivot 31 and 41.

At this point, since the working point 33 located in a position extending from the pivot 31 to the right-side moves to the upside, the movable-side wire gripping portion 2 connected to the first action portion 3 at the working point 33 moves to the upside, pressing down and gripping the linear object W fit into the stationary-side wire gripping portion 1.

All the actions described above can be done from the front side of the wire grip. And a worker doesn't need to move around, thus the wire grip has excellent workability.

In addition, since the linear object W can be gripped by pulling the pulling portion 62 substantially parallel to the stationary-side wire gripping portion 1 and the movable-side wire gripping portion 2, i.e. to the linear object W, it is unlikely that the moment is brought to the wire grip 100 and that excessive load is applied to the linear object W on the right end of the stationary-side wire gripping portion 1 or on the left end of the movable-side wire gripping portion 2.

Thus, it is less likely that the linear object W may curve again and again, making the life of the wire grip decrease, and that the linear object W may be damaged.

Additionally, as shown in FIG. 4, the right end of the connecting rod 5 is preferably located in the vicinity of the extension line of the movable-side wire gripping portion 2. Thus, the pivot 61 is preferably located in the vicinity of the linear object W.

Accordingly, when the connecting rod 5 is pulled substantially parallel to the stationary-side wire gripping portion 1 and the movable-side wire gripping portion 2, i.e. to the linear object with the pulling portion 62, the moment is much less brought to the wire grip 100 and there are no risks that the linear object W may retain the curved form, making the life of the wire grip decrease, and that the linear object W may be damaged without applying any excessive load to the linear object W on the right end of the stationary-side wire gripping portion 1 or on the left end of the movable-side wire gripping portion 2.

Also, in FIG. 4, by increasing a radius of rotation of the first action portion 3 compared to a radius of rotation of the second action portion 4, i.e. by setting the distance between the pivot 31 and 32 longer than the distance between the pivot 41 and 42, the substantially straight shaped connecting rod 5 is inclined upward to the right in the front view, making the right end of the connecting rod 5 closer to the linear object W. However, the present invention is not specifically limited to this.

In addition, the wire grip 100 also can be equipped with a stopper 7 as shown in FIGS. 2 and 4. Accordingly, the linear object W can be prevented from dropping off, from the completion of fitting the linear object W to the stationary-side wire gripping portion 1 to the completion of gripping the linear object W by pulling the pulling portion 62.

Also, in this embodiment, the stopper 7 can be attached not only to the stationary-side wire gripping portion 1 but also to the movable-side wire gripping portion 2.

INDUSTRIAL APPLICABILITY

This invention is to be suitably utilized for the wire grip which grips the electric wire such as an electric power wire and a communication wire, the elevator wire or the like, and the linear object such as a chain.

REFERENCE SIGNS LIST 100 wire grip
10 body
1 stationary-side wire gripping portion
2 movable-side wire gripping portion
3 first action portion
4 second action portion
5 connecting rod

The invention claimed is:

1. A wire grip, comprising;
a stationary-side wire gripping portion provided with a body and having a substantially straight front shape, and
a moveable-side wire gripping portion arranged to face the stationary-side wire gripping portion and set moveable back and forth with respect to the stationary-side wire gripping portion, whereby a linear object can be gripped between said stationary-side wire gripping portion and said moveable-side wire gripping portion;
wherein one end of a first action portion for moving said moveable-side wire gripping portion back and forth is turnably attached to the body as a pivot (31), and one end of a second action portion connected to the first action portion by a connecting rod is turnably attached to said body as a pivot (41) which is different from the pivot (31) of said first action portion;
wherein said first action portion is turnably attached to one end of said connecting rod, setting the other end of said first action portion as a pivot (32);
wherein said one end of said first action portion extends from said pivot (31) which said one end of the first action portion is attached to, and is turnably connected to said moveable-side wire gripping portion in an extended position from said pivot (31) of the first action portion;
wherein said second action portion is turnably attached to an intermediate portion of said connecting rod, setting the other end of said second action portion as a pivot (42);
wherein said first action portion is substantially perpendicular to a line connecting said pivot (31) and said pivot (32) and the first action portion extends from a vicinity of said pivot (31) to a pulling direction of said moveable-side wire gripping portion to take on a substantially L-shape as a whole;
wherein a pulling portion (6) pulled substantially parallel to said stationary-side wire gripping portion and said moveable-side wire gripping portion is turnably provided with a pivot (61) located on an end of a pulling side of said moveable-side wire gripping portion of said connecting rod;
wherein the other end of said connecting rod is pulled substantially parallel to said stationary-side wire gripping portion and said moveable-side wire gripping portion so that said connecting rod, said second action portion and said first action portion are linked to act to move said moveable-side wire gripping portion forward with respect to said stationary-side wire gripping portion.

2. The wire grip of claim 1, wherein the other end of said connecting rod is located in the vicinity of the extension line of said moveable-side wire gripping portion.

3. The wire grip of claim 1, wherein the linear object is an electric wire.

4. The wire grip of claim 3, wherein the electric wire is an electric power wire or a communications wire.

5. The wire grip of claim 1, wherein the distance between pivot point (31) and pivot point (32) is greater than the distance between pivot point (41) and pivot point (42).

6. The wire grip of claim 1, wherein the distance between pivot point (32) and pivot point (42) is greater than the distance between pivot point (42) and pivot point (61).

* * * * *